United States Patent
Gilar et al.

(10) Patent No.: US 12,259,369 B2
(45) Date of Patent: Mar. 25, 2025

(54) MICRO SOLID PHASE EXTRACTION DEVICES AND METHODS

(71) Applicant: Waters Technologies Corporation, Milford, MA (US)

(72) Inventors: Martin Gilar, Franklin, MA (US); Thomas S. McDonald, Littleton, MA (US); Joseph D. Michienzi, Plainville, MA (US); Jeffrey Musacchio, Sharon, MA (US); Rachel Mumma, Mullica Hill, NJ (US); Keith Fadgen, Hope Valley, RI (US); Geoff C. Gerhardt, Woonsocket, RI (US)

(73) Assignee: Waters Technologies Corporation, Milford, MA (US)

( * ) Notice: Subject to any disclaimer, the term of this patent is extended or adjusted under 35 U.S.C. 154(b) by 741 days.

(21) Appl. No.: 17/057,361

(22) PCT Filed: May 20, 2019

(86) PCT No.: PCT/IB2019/054162
§ 371 (c)(1),
(2) Date: Nov. 20, 2020

(87) PCT Pub. No.: WO2019/224702
PCT Pub. Date: Nov. 28, 2019

(65) Prior Publication Data
US 2021/0199624 A1    Jul. 1, 2021

Related U.S. Application Data

(60) Provisional application No. 62/820,902, filed on Mar. 20, 2019, provisional application No. 62/674,146, filed on May 21, 2018.

(51) Int. Cl.
*G01N 30/06* (2006.01)
*B01D 15/16* (2006.01)
(Continued)

(52) U.S. Cl.
CPC .......... *G01N 30/06* (2013.01); *B01D 15/161* (2013.01); *B01D 15/22* (2013.01);
(Continued)

(58) Field of Classification Search
CPC ........ G01N 30/06; G01N 1/405; G01N 30/54; G01N 30/60; G01N 2030/009;
(Continued)

(56) References Cited

U.S. PATENT DOCUMENTS 3,762,407 A * 10/1973 Shonerd .................... A62B 7/02
128/205.21
4,563,275 A * 1/1986 McEachern ........ G01N 30/6091
D24/232
(Continued)

FOREIGN PATENT DOCUMENTS

| CN | 1895717 A | 1/2007 | |
|---|---|---|---|
| DE | 202016103304 | * 9/2016 | ............. G01N 30/06 |
| DE | 202016103304 U1 | 9/2016 | |

OTHER PUBLICATIONS

Fontanals et al. "Overview of the novel sorbents available in solid-phase extraction to improve the capacity and selectivity of analytical determinations." Contrib. Sci. 6(2010): 199-213.
(Continued)

*Primary Examiner* — Alexander Satanovsky
*Assistant Examiner* — Sharah Zaab
(74) *Attorney, Agent, or Firm* — WOMBLE BOND DICKINSON (US) LLP; Deborah M. Vernon; Mark R. DeLuca

(57) ABSTRACT

Sample preparation and separation can be performed using a sample cartridge (201). The cartridge includes a barrel (204) with a first and second end, a column segment (209) connected to the second end of the barrel, and a column (205) containing a sorbent material. The sorbent material
(Continued)

includes particles that have antibodies attached to them to selectively retain analytes, proteins attached to them to retain certain classes of antibodies, or enzymes attached to them to perform specific modifications to certain classes of molecules. The column segment can be in thermal communication with a temperature control device in order to control the temperature of the column.

20 Claims, 11 Drawing Sheets

(51) Int. Cl.
| | |
|---|---|
| *B01D 15/22* | (2006.01) |
| *B01D 15/38* | (2006.01) |
| *B01J 20/24* | (2006.01) |
| *B01J 20/28* | (2006.01) |
| *B01J 20/288* | (2006.01) |
| *B01J 20/32* | (2006.01) |
| *G01N 1/40* | (2006.01) |
| *G01N 30/00* | (2006.01) |
| *G01N 30/54* | (2006.01) |
| *G01N 30/60* | (2006.01) |
| *G01N 30/88* | (2006.01) |

(52) U.S. Cl.
CPC .......... *B01D 15/3809* (2013.01); *B01J 20/24* (2013.01); *B01J 20/28016* (2013.01); *B01J 20/28052* (2013.01); *B01J 20/288* (2013.01); *B01J 20/3274* (2013.01); *G01N 1/405* (2013.01); *G01N 30/54* (2013.01); *G01N 30/60* (2013.01); *B01J 2220/54* (2013.01); *B01J 2220/62* (2013.01); *G01N 2030/009* (2013.01); *G01N 2030/062* (2013.01); *G01N 2030/8831* (2013.01)

(58) Field of Classification Search
CPC ..... G01N 2030/062; G01N 2030/8831; B01D 15/161; B01D 15/22; B01D 15/3809; B01J 20/24; B01J 20/28016; B01J 20/28052; B01J 20/288; B01J 20/3274; B01J 2220/54; B01J 2220/62

See application file for complete search history.

(56) References Cited

U.S. PATENT DOCUMENTS

| | | | | |
|---|---|---|---|---|
| 5,198,115 | A | * | 3/1993 | Stalling ................ G01N 30/467 |
| | | | | 210/634 |
| 5,601,707 | A | * | 2/1997 | Clay ................... F16K 15/1823 |
| | | | | 210/511 |
| 6,074,556 | A | * | 6/2000 | Van Davelaar ........ B01D 15/08 |
| | | | | 210/656 |
| 7,722,820 | B2 | * | 5/2010 | Gjerde ............... G01N 30/6065 |
| | | | | 436/178 |
| 2006/0019407 | A1 | | 1/2006 | Fulton et al. |
| 2010/0081209 | A1 | | 4/2010 | Brewer |
| 2011/0133077 | A1 | | 6/2011 | Henion et al. |
| 2016/0252435 | A1 | | 9/2016 | Sasano |
| 2017/0282096 | A1 | * | 10/2017 | Bouvier ................. B01D 15/20 |
| 2017/0292123 | A1 | | 10/2017 | Greiler et al. |

OTHER PUBLICATIONS

Hahn et al. "Comparison of protein A affinity sorbents." J. Chromatogr. B. 790(2003): 1-2.
International Search Report and Written Opinion issued in PCT Application No. PCT/IB2019/054161 mailed Oct. 8, 2019.
International Search Report and Written Opinion issued in PCT Application No. PCT/IB2019/054162 mailed Dec. 9, 2019.
Medina-Casanellas et al. "Preparation and evaluation of an immunoaffinity sorbent with Fab' antibody fragments for the analysis of opioid peptides by on-line immunoaffinity solid-phase extraction capillary electrophoresis—mass spec." Anal. Chim. Acta. 789(2013): 91-99.

* cited by examiner

MICRO SOLID PHASE EXTRACTION DEVICES AND METHODS

FIELD OF THE INVENTION

This application claims priority to and benefit of international application no. PCT/IB2019/054162 filed on May 20, 2019 entitled "Micro Solid Phase Extraction Devices and Methods," and to United States provisional patent application No. 62/674,146 filed on May 21, 2018 entitled "Micro Solid Phase Extraction Devices and Methods," and to United States provisional patent application No. 62/820,902 filed on Mar. 20, 2019 entitled "Micro Solid Phase Extraction Devices and Methods"; the entire contents of each of the applications is incorporated herein by reference in their entirety.

FIELD OF THE INVENTION

The present technology generally relates to devices and methods for performing sample preparation (e.g., sample washing, concentration, extraction) and separation, and in particular, sample preparation and separation using micro solid phase extraction (μSPE) devices.

BACKGROUND

Sample preparation plays a major role in analyzing complex samples, such as biological samples. For example, blood contains a high concentration of proteins and lipids that can be detrimental for chromatographic and/or MS analysis. Therefore, sample clean-up (e.g. washing), extraction (e.g., concentrating) and separation from a complex sample are needed before analysis.

Microfluidic liquid chromatography (μLC) is often utilized for trace and high-sensitivity analysis. μLC can be performed on very small samples, and may be particularly relevant where larger volumes of samples are unavailable or prohibitively expensive. Traditional sample preparation methods such as solid phase extraction (SPE), protein precipitation (PP), liquid-liquid extraction (LLE), and dialysis may start with as much as 0.2-1 mL of sample, which may be diluted during processing up to a total volume of 0.5-10 mL. These "bulky" sample prep methods have limited compatibility with μLC, because they require an amount of sample that is otherwise unnecessary for μLC, which introduces waste and excess cost, and where sufficient sample is unavailable, may preclude the analysis.

SUMMARY

Provided herein are devices and methods for performing washing, extraction, and separation of a sample in a cartridge. For example, a μSPE device can be temperature controlled in order to enhance chromatographic performance, or could be packed with a sorbent material having antibodies attached to it in order to selectively retain certain analytes.

One aspect of the present technology is directed to a cartridge for use in the washing and separation of a sample. The cartridge includes a barrel having a barrel first end that is open and a barrel second end opposite the barrel first end. The cartridge also includes a column segment, having a column segment first end connected to the barrel second end and a column segment second end opposite the column segment first end. The cartridge also includes a column spanning the column segment, the column containing a sorbent material and having a column first end in fluid communication with the barrel second end and a column second end opposite the column first end. The cartridge also includes a mobile phase source port at the column segment first end and in fluid communication with the column first end. The sorbent material includes particles that have antibodies attached to them to selectively retain analytes, proteins attached to them to retain certain classes of antibodies, or enzymes attached to them to perform specific modifications to certain classes of molecules.

The above aspect of the present technology can include one or more of the following features. According to one embodiment, the sorbent material includes particles that have antibodies to selectively retain small molecules, proteins, or other antibodies. According to another embodiment, the sorbent material includes particles that have one or more of protein A, G, or L attached to them to retain certain classes of antibodies. According to another embodiment, the sorbent material includes particles that have one or more of trypsin, pepsin, PNGaseF, or IdeS attached to them to perform specific digestion or modifications to certain classes of molecules.

Another aspect of the present technology is directed to a cartridge for use in the washing and separation of a sample. The cartridge includes a barrel having a barrel first end that is open and a barrel second end opposite the barrel first end. The cartridge also includes a column segment, having a column segment first end connected to the barrel second end and a column segment second end opposite the column segment first end. The cartridge also includes a column spanning the column segment and having a column first end in fluid communication with the barrel second end and a column second end opposite the column first end. The cartridge also includes a temperature control element operatively coupled to the column segment and configured to control a temperature of the column. The cartridge also includes a mobile phase source port at the column segment first end and in fluid communication with the column first end.

The above aspect of the present technology can include one or more of the following features. According to one embodiment, the temperature control element includes a heating element configured to heat the column segment. According to another embodiment, the heating element is configured to heat the column segment after the column segment has been loaded at room temperature. According to another embodiment, the heating element is configured to heat the column segment in order to produce narrow peak widths in certain types of chromatography. According to another embodiment, the heating element is configured to operate at a substantially constant temperature between about 20-90 degrees Celsius. According to another embodiment, the temperature control device includes a cooling element configured to cool the column. According to another embodiment, the cooling element is configured to cool the column in order to load the column at sub-ambient temperatures.

Another aspect of the present technology is directed to a method for the washing, extraction, and separation of a sample in a chromatography cartridge comprising a barrel and a column. The method includes adding a sample to the barrel; adding a portion of solvent to the barrel to wash the sample; and loading at least a portion of the sample onto the column. The method also includes controlling a temperature of the column using a temperature control device operatively coupled to the column. The method also includes creating a first connection between a mobile phase source and a first end of the column, such that the connection bypasses the barrel, and a second connection between an outlet line and a second end of the column. The method also includes pressurizing a mobile phase flow from the mobile phase source through the column to the outlet line.

The above aspect of the present technology can include one or more of the following features. According to one embodiment, controlling the temperature of the column includes heating the column after loading the column. According to another embodiment, controlling the temperature of the column includes operating the temperature control device at a substantially constant temperature between about 20-90 degrees Celsius in order to achieve narrow peak widths in certain types of chromatography. According to another embodiment, controlling the temperature of the column includes operating the temperature control device at a substantially constant temperature between about 20-90 degrees Celsius in order to enhance enzymatic or chemical processes. In a non-limiting embodiment, the temperature can be as high as about 100 degrees Celsius, however boiling of the liquid is not desirable. According to another embodiment, controlling the temperature of the column includes cooling the column to load at sub-ambient temperatures in order to enhance retention. According to another embodiment, the method also includes packing at least a portion of the column with sorbent materials including particles that have antibodies attached to them to selectively retain analytes, proteins attached to them to retain certain classes of antibodies, or enzymes attached to them to perform specific modifications to certain classes of molecules. According to another embodiment, the method also includes passing a mobile phase through a column packed with a second sorbent material after passing the mobile phase through a column having a first sorbent material, wherein the first sorbent material and the second sorbent material includes particles that have antibodies attached to them to selectively retain analytes, proteins attached to them to retain certain classes of antibodies, or enzymes attached to them to perform specific modifications to certain classes of molecules.

The present technology has numerous advantages. In particular, the ability to control the temperature of the μSPE device allows for loading and elution at specific temperatures in order to enhance retention, narrow peak widths for certain types of chromatography, or enhance a particular chemical process. Packing the μSPE device with sorbent materials that have particular antibodies bound to them can increase sensitivity of a system by allowing for the capture and concentration of a targeted analyte.

The current disclosure provides for disposable cartridges, obviating the need for washing the cartridge and avoiding contamination where a used cartridge has not been washed completely. Some embodiments of the present technology provide for cartridges that are sufficiently low-cost that they may be disposed after one or a few uses. These disposable cartridges provide for separation of "dirty" samples that contain components that would tend to be retained in a cartridge and resist effective cleaning.

Embodiments of the present technology permit loading of the μSPE device in an online or offline manner Embodiments of the present technology also allow for elution from the μSPE device into a container for discontinuous analysis, online to a detector, or online to a secondary chromatography dimension followed by detection.

BRIEF DESCRIPTION OF THE DRAWINGS

The invention may be more fully understood from the following detailed description taken in conjunction with the accompanying drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present technology.

In general, the present technology is directed to devices and methods that provide for a highly sensitive MS and µLC/MS (micro liquid chromatography/mass spectroscopy) analysis to be performed. In one embodiment, cartridges are provided with a structure that permits off-line sample loading and on-line elution. In certain embodiments, to provide on-line elution, one or more portions of the cartridge are tailored to support pressurization of the column and in some instances to allow eluate to be sent directly to a detector without unnecessary sample dilution or dispersion. As a result, a highly sensitive MS and µLC/MS analysis can be performed. As used herein, "on-line" refers to operation as a portion of a pressurized flowstream established by and within the system. By contrast, "off-line" refers to operation out of such a pressurized flowstream.

In embodiments, vacuum, positive pressure, or centrifugal forces may be applied to the cartridges to process the samples. Vacuum, positive pressure or centrifugal forces can be used to process about 10-250 µL of sample, trap the analytes of interest, and wash away the undesirable impurities. This could be accomplished with a robotic autosampler or manually by the operator. The loaded µSPE (micro solid phase extraction) plate can be eluted both in off-line or preferably in on-line mode. In the latter approach the plate is placed into a separate holder/clamp and eluted by a flow stream of mobile phase. This is realized in quick serial fashion; eluent is sent directly into the detector (e.g. mass spectrometer) or for further analysis to µLC. The µSPE device is designed such that the µSPE wells can be eluted without unnecessary sample dilution or dispersion, permitting a highly sensitive MS and µLC/MS analysis.

Figure 1:
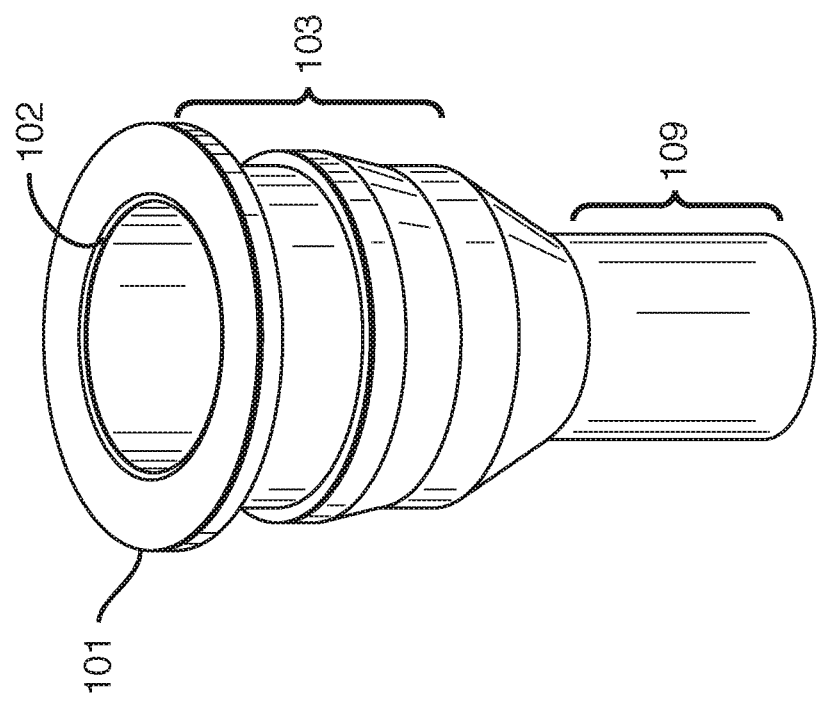
FIG. 1 illustrates a cartridge in accordance with an embodiment of the present technology.

In addition to being able to sustain increased pressures, some embodiments of the µSPE device described herein can be temperature controlled in order to customize the temperature of the cartridge during loading and/or elution. In particular, the µSPE device can be operatively coupled to a temperature control device (such as a heating or a cooling element) in order to load and elute at specific temperatures in order to enhance retention, narrow peak widths for certain types of chromatography, or enhance a particular chemical process. According to additional embodiments, the µSPE device can be packed with specific sorbent materials that have particular antibodies bound to them in order to allow for the capture and concentration of a targeted analyte An exemplary µSPE cartridge 101 is depicted in FIG. 1. As shown, cartridge 101 is a unitary construction with a barrel section 103 and column section 109 made of the same material. As shown, cartridge 101 has a barrel first end 102 that is open. A sample for sample preparation can be inserted into the barrel section 103 (e.g., for sample washing and for loading onto the column). That is, the interior of the barrel between the barrel first end 102 (see FIG. 1) and the barrel second end 206 (see FIG. 2) may be unfilled and may be configured to receive the sample. Column section 109 includes a column filled with a stationary phase/sorbent (not shown). In some embodiments, the sorbent material includes particles that have antibodies to selectively retain small molecules, proteins, or other antibodies. Alternatively, or in addition, the sorbent materials can have enzymes attached to them in order to perform specific modifications to certain classes of molecules. The sorbent material can include, for example, particles that have one or more of protein A, G, or L attached to them to retain certain classes of antibodies. In another embodiment, the sorbent material can include particles that have one or more or trypsin, pepsin, PNGaseF, or IdeS attached to them to perform specific digestion or modifications to certain classes of molecules. The column may have a resolving power of 10 to 2000 theoretical plates. The column disposed within the column section 109 can have any practical size dimension. For example, a column inner diameter may be large as about 10 mm. In general, it will be more practical for smaller inner diameter sizes, such as 5 mm, 4 mm, 2 mm, or 1 mm. The column can be sized to have any practicable length. In some embodiments, the column may have a length of at least 2 mm. And, in some embodiments, the length of the column and the inner diameter are correlated to each other. For example, the column may have a length that is at least about 2 times larger than its diameter. Further, the column's inner diameter can be the same size or substantially the same size throughout its length. Alternatively, the diameter can be graduated, such that the diameter either reduces or increases along the length of the column. By packing the column with sorbents which have antibodies bound to them, it can be possible to selectively retain analytes (i.e. small molecules, proteins, other antibodies, etc.) for which the antibodies within the column are designed.

Figure 2:
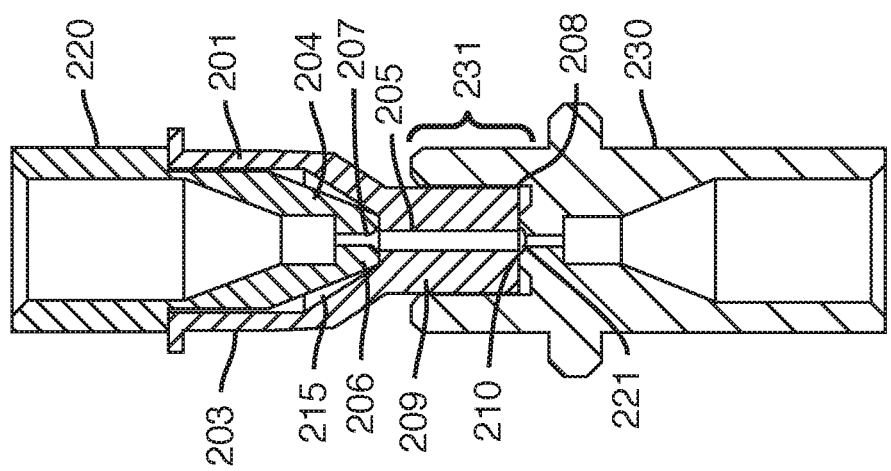
FIG. 2 is a cross-sectional illustration of an embodiment of a cartridge mounted within a portion of an extraction system, according to an embodiment of the present disclosure.

FIG. 2 shows a cross-sectional illustration of a cartridge 201 mounted within a portion of an extraction system, according to an embodiment of the present disclosure. Cartridge 201 has a barrel 204 within barrel section 203 and a column 205 within column section 209. Solvent source 220 is inserted into the barrel 204 of cartridge 201 such that it bypasses the open volume of barrel 204 and connects directly to first end 207 of column 205. It may be appreciated that the same solvent source 220 could be used to provide a wash solvent into barrel 204 by positioning solvent source 220 higher relative to cartridge 201, such that solvent could be released into barrel 204 to wash a sample and to load the sample onto the column (i.e., prior to chromatographic separation). Alternatively, a different source could be provided for wash purposes.

Outlet 230 is connected to the second end 208 of column 205. Outlet 230 is configured with a fitting 231 that cups the portion of cartridge 201 surrounding column 205, providing additional structural support to the column and avoiding deformation of column 205 and the surrounding cartridge portion when under pressure. That is, fitting 231 reinforces the column segment 209 by supporting the exterior of the column segment 209. Outlet line 221 contains a fluidic connection to the second end 210 of the column 205 to pass directly to µLC/MS analysis.

Figure 3:
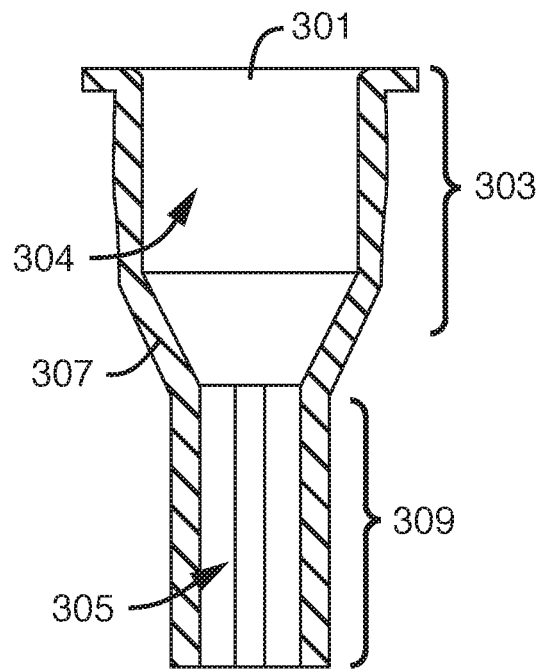
FIG. 3 is a cross-sectional illustration of another embodiment of a cartridge packed with a sorbent material, according to an embodiment of the present disclosure.

By providing a direct fluidic connection between the solvent source 220 and the column 205, elution of the sample loaded on the stationary phase can be directly sent to an LC column and/or detector. In order to provide these connections, the column segment 209 is tailored to provide the appropriate structure to withstand pressurization of the mobile flow passing through and/or the pressure of the separation of the sample passing through column 205. In some embodiments, the tailed structure allows for the column segment 209 to withstand pressures of about 5000 psi or greater (e.g., 6000 psi, 8000 psi, 10000 psi, 12000 psi, 15000 psi). Numerous designs can be utilized to provide such a connection. In FIG. 2, outlet 230 includes a fitting 231 that cups and secures the column segment 209 to provide such a connection. That is, the column segment 209 has been reinforced to provide the pressure-tight connection. In FIG. 3, the structure of the cartridge is tailored in a different way to allow direct connection of the mobile source 220 to the first end 207 of the column for on-line elution.

FIG. 3 illustrates a cross-sectional view of a cartridge 301 packed with a sorbent material within the column 305, according to an embodiment of the present disclosure. In this example embodiment, the cartridge 301 has a unitary design (e.g., not detachable) including a barrel section 303 and a column section 309. The cartridge 301 can be made of a polymeric material, such as, for example, HDPE, which can be injected molded to provide the appropriate form. To provide for high pressure operation, a tube made of a high pressure material, e.g., a metallic tube or a tube made of high strength polymer (and different from the molded cartridge) can be inserted and secured within the cartridge 301 to provide the unitary design. The column 305 can be secured within the cartridge 301 by heat shrinking, adhesive, or mechanical slip fit design. In this example embodiment, the column 305 is packed with a sorbent material, as discussed above.

In some embodiments, the sorbent material within the column 305 includes particles that have antibodies to selectively retain small molecules, proteins, or other antibodies. Alternatively, or in addition, the sorbent materials can have enzymes attached to them in order to perform specific modifications to certain classes of molecules. The sorbent material can include, for example, particles that have one or more of protein A, G, or L attached to them to retain certain classes of antibodies. In another embodiment, the sorbent material can include particles that have one or more or trypsin, pepsin, PNGaseF, or IdeS attached to them to perform specific digestion or modifications to certain classes of molecules.

Figure 4:
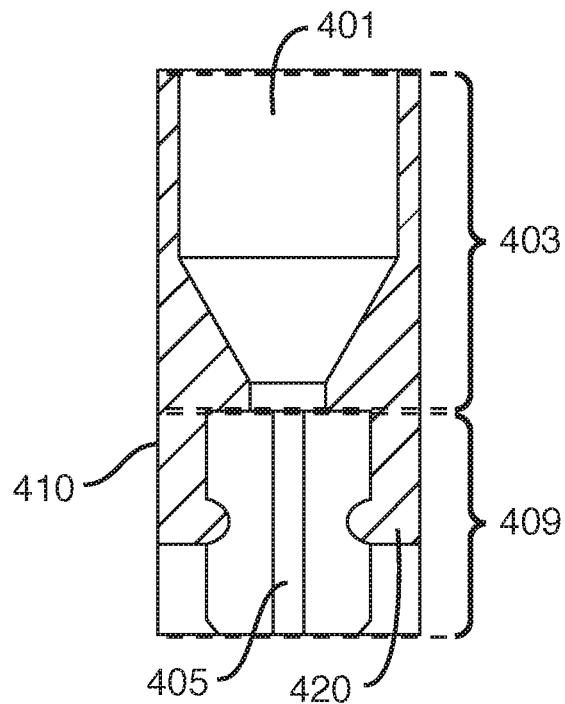
FIG. 4 is a cross-sectional illustration of a further embodiment of a cartridge packed with a sorbent material, according to an embodiment of the present disclosure.

FIG. 4 illustrates a cross-sectional illustration of a detachable barrel and column design packed with a sorbent material, according to an embodiment of the present disclosure. In this example embodiment, instead of both the barrel segment and column segment being formed of an integrated single piece of material, the cartridge 401 formed of two pieces made of different materials, which can be separated or detached from each other. The barrel segment 403 includes a clamp 420 that seals the barrel section 403 to the column segment 409. The clamp 420 holds and secures the two pieces together, but can be pressure activated, such that the barrel segment 403 can be removed if desired, especially during on-line elution when the barrel segment 403 is no longer needed (e.g., after sample has been washed and loaded onto the column). Tolerances of the barrel segment 403 and the column segment 409 as well as clamp 420 are highly controlled, such that when the barrel segment 403 is clamped to column segment 409, cylindrical portions of the barrel segment and column segment are aligned (i.e., have collinear axes). Using a two-piece design, the column segment 409 can be formed of a high pressure polymer different than that used for the barrel section 403. For example, the column segment 409 could be formed of PEEK to allow high pressure operation (e.g., at 15,000 psi and above). The barrel section 403 can be formed of a different material, such as polypropylene. In this example embodiment, the column 405 can be packed with a sorbent material, as discussed above. The column segment 409 is also operatively coupled to a temperature control element 410. In one example embodiment, modifying the temperature of the device at or near the column segment 409 using a temperature control element 410 can enhance chromatographic performance. The temperature control element 410 can be coupled to the clamp portion 420 or the column 405, according to various embodiments. The column segment 409 can be heated, for example, using a thermoelectric heating element, resistively, inductively, or in some other suitable way. The ability to control the temperature of the column allows a user to load at room temperature to enhance retention, and then elute at a warmer temperature, in one embodiment. In alternative embodiments, the system can operate at a constant high temperature in order to narrow peak widths in certain types of chromatography, or operate at a constant warm temperature in order to enhance a particular enzymatic or chemical process. In still other embodiments, the temperature control element 410 can chill the column segment 409 using a thermoelectric element or a stirling engine. The ability to cool the column can allow a user to load the column at sub-ambient temperatures in order to further enhance retention, to accentuate temperature dependent workflows such as hydrogen-deuterium exchange or online chemical derivatization, or to maintain chemical stability, according to various embodiments.

Figure 5:
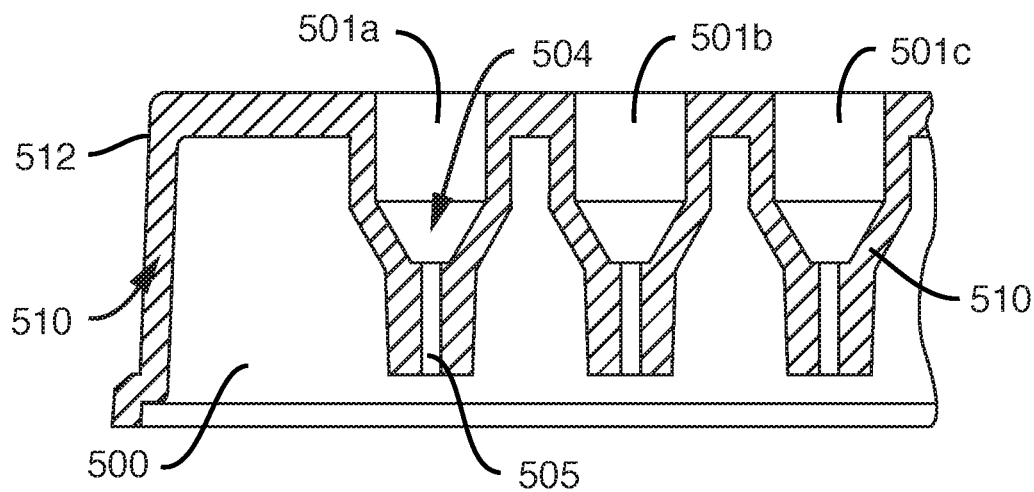
FIG. 5 is a cross-sectional illustration of three cartridges in a well-plate in communication with a temperature control device, according to an embodiment of the present disclosure.

FIG. 5 provides a cross-sectional illustration of another possible cartridge structure in communication with a temperature control device, in accordance with the present technology. Plate 500 is a one-piece molded polymer structure (such as HDPE) housing multiple cartridges 501a, 501b, and 501c. While FIG. 5 shows three cartridges, any number of cartridges can be included in various grids or other arrangements (e.g., 96 cartridges/sample wells). Each cartridge or sample well 501a, 501b, and 501c, includes a barrel 504 and a column 505. To provide reinforcement along the cartridges 501a, 501b, and 501c, a wall or skirt 510 of a reinforcing material is disposed about each cartridge to reinforce the connection between the barrel 504 and the column 505 to support the exterior of the cartridges, thereby avoiding or minimizing deformation of the column or cartridge wall when the cartridge is under pressure. In this example embodiment, the cartridge structure includes a temperature control element 512, similar to the one discussed above in reference to FIG. 4. The temperature control element can be in communication with the wall or skirt 510 that is positioned at least partially around the column 505 of one or all of the sample wells 501a, 501b, 501c. As will be appreciated, plates with numerous sample wells may require multiple temperature control elements in thermal communication with different portions of the plate in order to control the temperature at the column of each sample well. In one example embodiment, the wall or skirt 510 is made of a thermally conductive material in order to help control the temperature of the columns of the sample wells.

Figure 6:
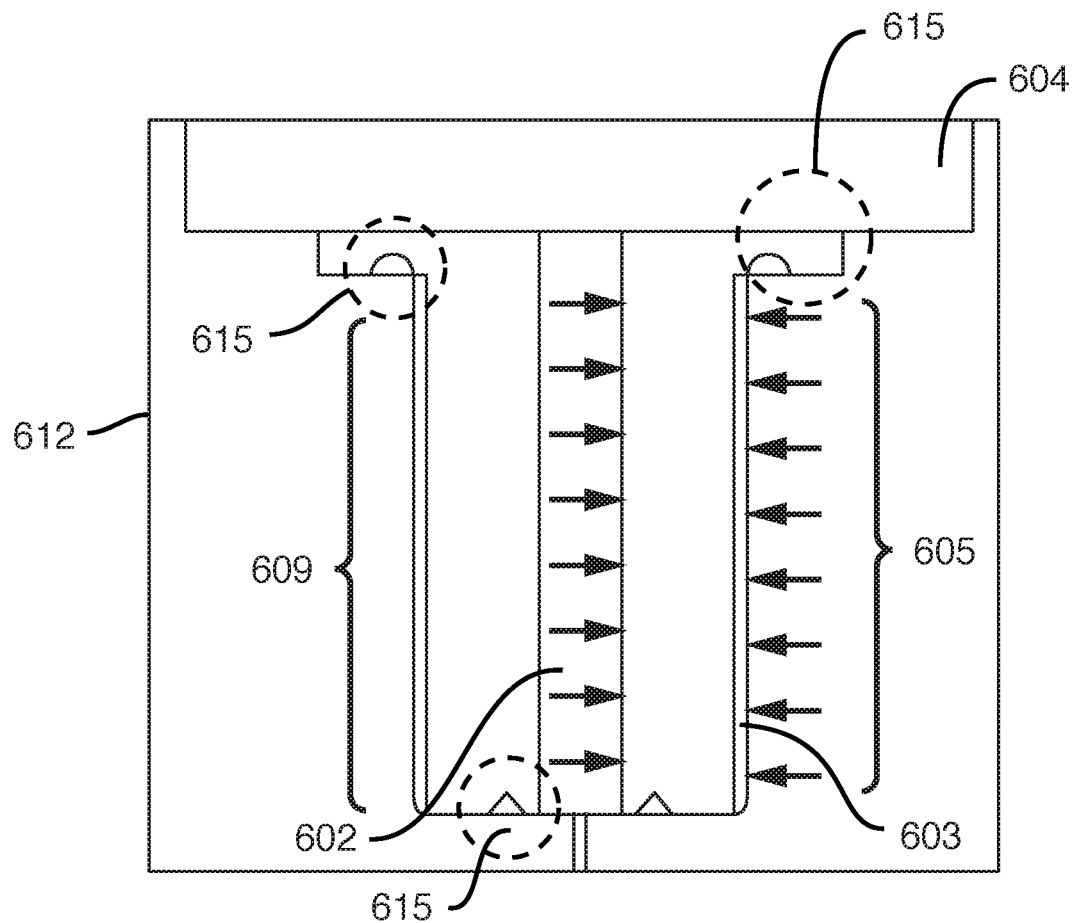
FIG. 6 is a cross-sectional illustration of a column portion of a cartridge with a waterjacket, according to an embodiment of the present disclosure.

Another example design that provides additional support to allow on-line elution is shown in cross-section in FIG. 6. In this embodiment, the column 602 is provided with a clamp, in particular a fluid jacket or waterjacket 605 that distributes pressures around and about the column 602. Waterjacket 605 may be any fluid jacket which may exert pressure (indicated by arrows in FIG. 6, on the column 605 or other component of cartridge in order to maintain the structure of the cartridge. The waterjacket 605 can apply a pressure on an outer surface 603 that is less than or more than the internal pressure of the column 602. That is, the waterjacket 605, can apply a pressure that minimizes any bulging of the column segment 609. When the pressure of the waterjacket 605 is greater than the internal fluidic pressure of column 602, the waterjacket 605 radially compresses the column 602, which may enhance chromatographic performance One or more force concentrators 615 (e.g., notch or cutout) can be included in the column segment 609 to further secure and seal the column segment 609 to the barrel 604. In this example embodiment, the cartridge structure also includes a temperature control element 612, similar to the one discussed above in reference to FIG. 4, that is thermally connected to the column segment 609.

Figure 7A:
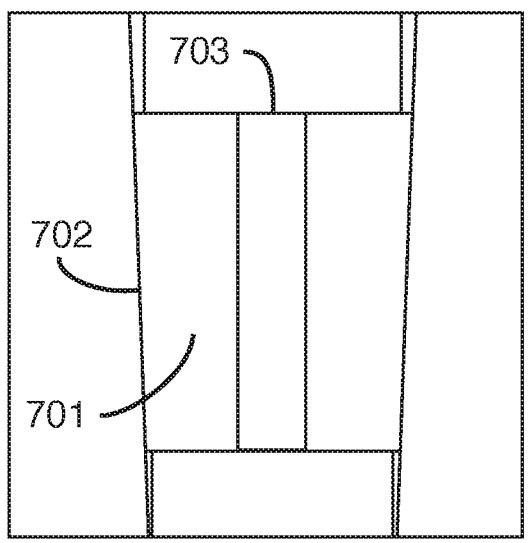
FIG. 7A is a cross-sectional illustration of a column portion of a cartridge with a tapered wall, according to an embodiment of the present disclosure.
Figure 7B:
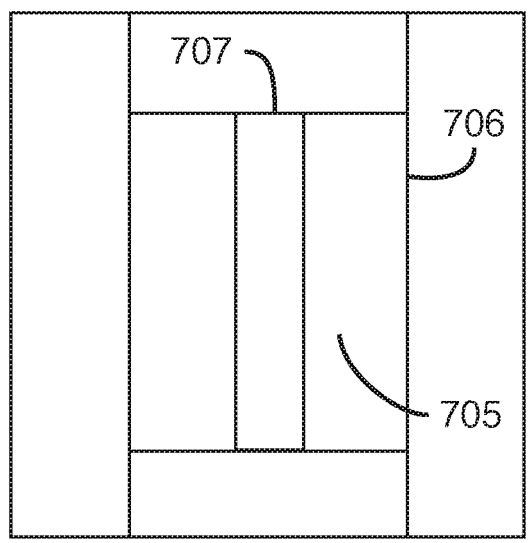
FIG. 7B is a cross-sectional illustration of a column portion of a cartridge straight wall, according to an embodiment of the present disclosure.

Another possible configuration or tailoring of the cartridge to aid in pressure connection is applied to an exterior of the column segment. FIG. 7A shows an example tapered cartridge 701 in which side walls 702 surrounding column 703 are tapered. By comparison FIG. 7B shows an example straight-walled cartridge 705, which has straight walls 706 surrounding column 707. Tapered walls may provide advantages to more easily loading the cartridge into a sample well by taking advantage of the narrow portion of the tapered wall. Additionally, the taper may be desirable for the structural strength of the cartridge. The well or fitting (e.g., connection to the column) may be designed to have a reverse taper in order to receive the tapered cartridge while providing a sufficiently tight connection in order to support the cartridge wall. A thermal control device, such as the ones described above, can also be in thermal communication with the cartridges 701, 705, according to some embodiments.

Alternatively, or in addition to reinforcing components of the cartridge and/or connection to the outlet line (as shown in FIG. 2) to provide enhanced fluidic connections, other cartridge components can be tailored. For example, in FIG. 2, first end 207 of the column 205 can be tailored to enhance the connection to the mobile phase source 220. That is, in certain embodiments, the first end 207 is shaped to mate with a fluidic line providing the mobile phase source 220 to the column 205. Examples of such a shape include tapering the first end 207, or a force fit configuration to seal the column 205 to the line extending from the mobile phase source 220. In addition, the second end 208 of the column 205 can be tailored as well to provide for a pressure-tight fluidic connection to the outlet line 221. An eluate release port 210 designed to mate with the outlet line 221 can provide such a pressure-tight connection. The eluate release port 210 can be shaped (e.g., tapered or force fit configuration) to mate with a line 221 establishing connection to outlet 230.

In some embodiments, fits and/or seals to contain sorbent with the column can be provided. For example, referring to FIG. 2, a frit can be positioned and secured within the column at one or each of its ends 207, 208. One or more seals protecting the sorbent from the environment can also be provided at the column 205 ends 207 and 208. Preferably, frits and seals are included to have a form factor and attachment that does not substantially interfere with fluid flow. That is, it is preferable to attach or include frits that do not substantially disperse eluting peaks nor reduce chromatographic efficiency.

In general, barrel segments in accordance with the present technology and shown in each of FIGS. 1A, 2, 3, 4, 5, and 6, provide an open vessel or unfilled space for washing a sample and/or loading the sample on the column within the µSPE device. Prior to connecting the mobile phase source directly to the loaded column, the sample can be washed or treated before loading. The barrel segment can include a funnel portion, such as funnel portion 215 shown in FIG. 2 to help with loading of the sample into the column.

A sample intended for use in a chromatography separation may include the sample within a matrix having various components. Preparing the sample for use in the chromatography system may include a step of washing the sample, in which a certain solvent is introduced onto the sample material. This solvent may dissolve one or more components of the matrix so that these components may then be removed from the sample container, leaving behind a purified version of the sample. A plurality of wash steps may be used to increase the degree to which undesired components of the matrix are removed or to provide different solvents so that different components of the matrix are removed. The wash may be performed with a variety of solvents, including aqueous and organic solvents, mixtures of solvents, or solvents including dissolved components such as pH modifiers. The solvent may be, e.g., methanol, ethanol, acetonitrile, tetrahydrofuran, dimethoxyethane, chlorobutane, dichlorobenzene, pentanone, acetone, chloroform, cyclohexane, diethyl ether, ethyl acetate, pentane, hexane, heptane, ligroin, toluene, water, and combinations of the same. Additionally, the solvent may be or may include a pressurized gas, such as carbon dioxide, sulfur hexafluoride, chlorofluorocarbon, especially where the pressure and temperature are controlled such that the solvent is maintained in a fluid form at or near the critical point. The mobile phase may also be selected from the foregoing. While the mobile phase and the wash solvent may be the same, it may be noted that preferably the wash solvent will be selected to dissolve components from the matrix but not the sample, in order to leave the sample present for the separation. Additional properties other than the composition of the solvent may be used to favor dissolving either non-sample portions of the matrix, or sample, at the appropriate steps. Examples of these properties can include temperature, pressure, or duration of the contact with the solution.

As discussed above, washing and loading occurs in the barrel segment. The barrel is an unfilled space that can include a funnel section, such as funnel section 215, shown in FIG. 2. The column segment may comprise a material selected from HDPE (high-density polyethylene), PEEK (polyether ether ketone), PA (polyamide), PP (polypropylene), PVD (polyvinylidene fluoride), ceramic, and metal. The cartridge may additionally comprise a jacket or other reinforcing wall. The jacket surrounding the column or column segment typically includes a material to provide increased pressure resistance to prevent or minimize deformation of the column segment. The jacket may be formed of similar materials to that of the column segment and in some embodiments, can include a pocket of pressurized fluid to counteract fluid forces in the column. An example of a jacket is shown as jacket 231 in FIG. 2. Jacket 231 is integrated into outlet 230, however jacket 231 may also be a separate component of the system. The jacket may be configured around the column segment in order to provide reinforcement to the column and to increase the ability of the column to withstand high pressure. The use of a jacket may provide a particular advantage in that the other portions of the cartridge may be made of a single material at both the column and barrel portions and of a lighter material, reducing the weight, cost, and bulkiness of the structure and permitting a single-material continuous construction, while the jacket may provide necessary structural rigidity to the device allowing high pressure. Additionally, the jacket may be designed to be reusable or to be a component of a tray or holding position of the cartridge. Such an arrangement may reduce the cost and waste associated with the use of the jacket. Another example of a jacket is provided in FIG. 6, in which a pocket of pressurized fluid is used to counteract internal column pressure. According to some embodiments, the jacket 231 can be connected to the temperature control element described herein in order to heat or cool the column to a desired temperature.

In some embodiments, the column portion of the cartridge may be distinct from the barrel portion of the column. For example, FIG. 3 shows cartridge 301 with barrel 304 and column segment 305, which are made from different materials but are secured together or otherwise not detachable. Column segment 309 includes column 305, which is secured within the column segment 309 having an exterior 307 formed in unison with the barrel segment. FIG. 4 illustrates a two-part cartridge design, in which the barrel segment 403 is detachable from the column segment 409 using clamp 420. A cartridge having separate components may provide various advantages, such as permitting use of a lower-strength material for the barrel and a higher-strength material for the column portion, which may reduce cost and weight of the device. Further, if different barrels and column segments are interchangeable, the system may be more readily optimized for a particular user's needs.

Figure 8:
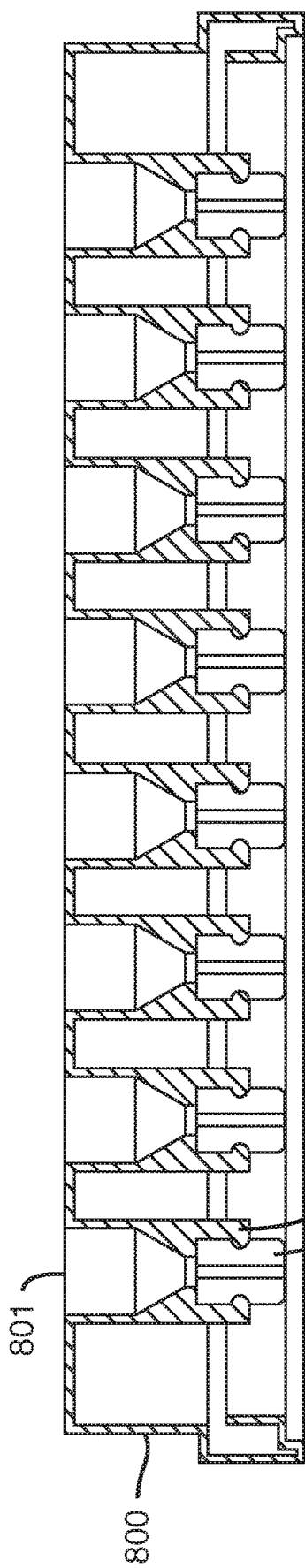
FIG. 8 is a cross-sectional illustration of a well plate having numerous sample wells with detachable column segments, according to an embodiment of the present disclosure.

Another aspect of the present technology is directed to a system utilizing disposable extraction-separation chromatography cartridges, in which the system includes a well-plate comprising a plurality of cartridge wells; a first solvent supply configured to deliver a first solvent to a barrel portion of an extraction-separation chromatography cartridge within any of the plurality of cartridge wells; a mobile phase source configured to deliver a mobile phase solvent to a first end of a column of an extraction-separation chromatography cartridge within any of the plurality of cartridge wells; and an outlet channel configured to receive solvent from a second end of the column which is opposite the first end of the column. The plates can be formed inexpensively in a unitary or possibly a detachable fashion to create disposable μSPE devices. FIG. 8 shows a cross-sectional view of an example disposable device 800 including several cartridges or wells 801 with barrel portion 803 that is detachable from the separation portion 809.

Figure 9:
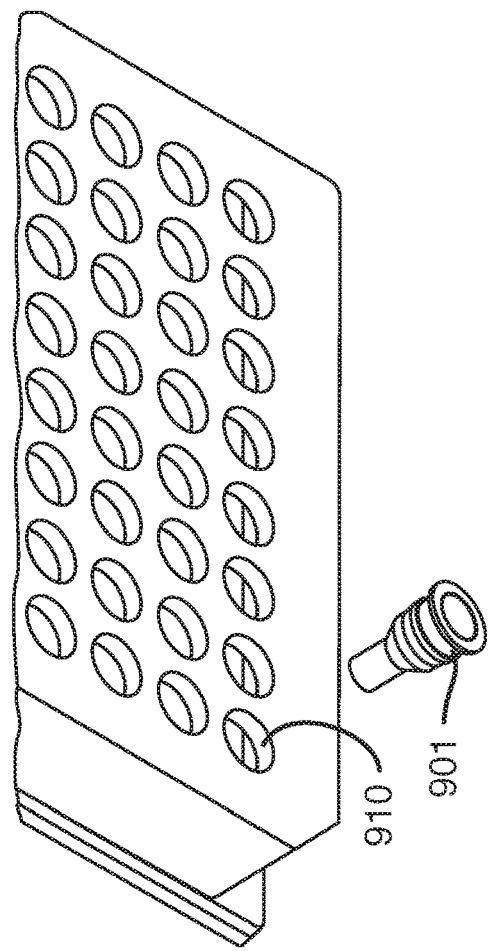
FIG. 9 illustrates a perspective view of a portion of a well plate in which a plurality of cartridges, such as the cartridge shown in FIG. 1, can be inserted.

FIG. 9 illustrates a μSPE device including a plate 905 having openings 910 for inserting one or more cartridges 901, in accordance with an embodiment of the present disclosure. An advantage of utilizing insertable cartridges into a plate is that the plate can be designed in any desired form (e.g., 96 well plate form, carousel form). Loaded μSPE cartridges within a plate can be eluted both in off-line or preferably in on-line mode. In the latter approach the plate is placed into a separate holder/clamp and eluted by a flow stream of mobile phase. The mobile phase is connected directly to the column to create a pressurized flow through the column for elution. This is realized in quick serial fashion; eluent is sent directly into the detector (e.g. mass spectrometer) or for further analysis to μLC. The μSPE device is designed such that the μSPE wells can be eluted without unnecessary sample dilution or dispersion, permitting a highly sensitive MS and μLC/MS analysis. According to some embodiments, a temperature control element, such as the ones described above, can be in thermal communication with the plate 905 in order to control the temperature at or near the column of the cartridge 901. As will be appreciated, plates with numerous openings for receiving a large number of cartridges may require multiple temperature control elements in thermal communication with different portions of the plate in order to control the temperature at the column of each cartridge. In one example embodiment, the plate 905 is made of a thermally conductive material in order to help control the temperature of the columns of the sample wells.

Figure 10:
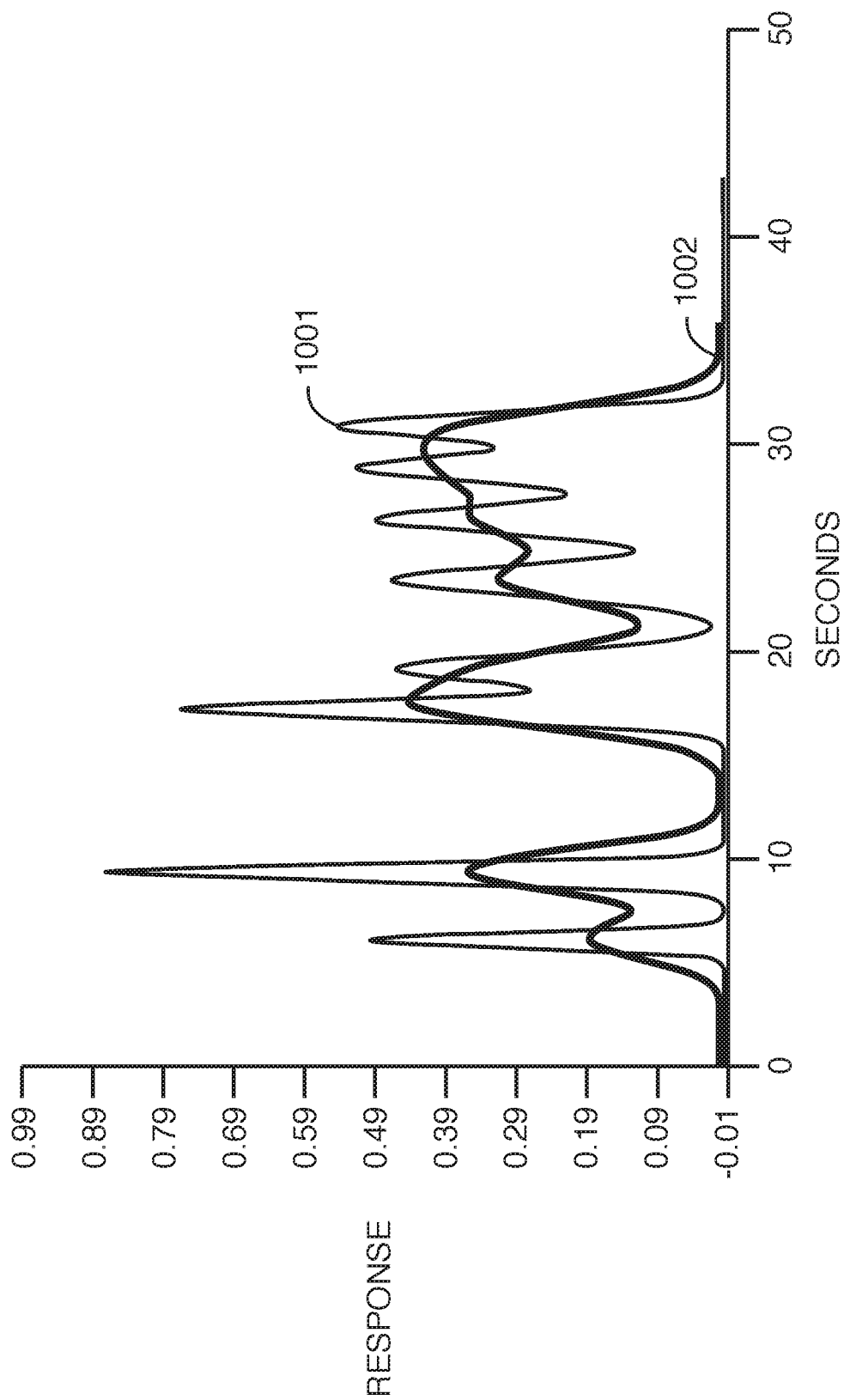
FIG. 10 illustrates a detector response showing minimal and moderate system dispersion, according to an embodiment of the present disclosure.

FIG. 10 shows a gradient elution on a μSPE device in accordance with one embodiment of the present technology. The response shown illustrates that partial separation of analyte from background is possible using the cartridge, as the cartridge acts as a small chromatographic column. The peak capacity in the order of 10-20 can be achieved using a 0.8×10 mm SPE well, as shown in curve 1001. As the SPE device minimizes dispersion, peak capacity and sensitivity is enhanced as compared to a 0.2 $\mu L^2$ system following the SPE device (i.e., two order chromatographic separation), which does not control dispersion as well as the devices in accordance with the present technology. Curve 1002 shows the gradient response for the system including the 0.2 $\mu L^2$ chromatographic column.

Figure 11:
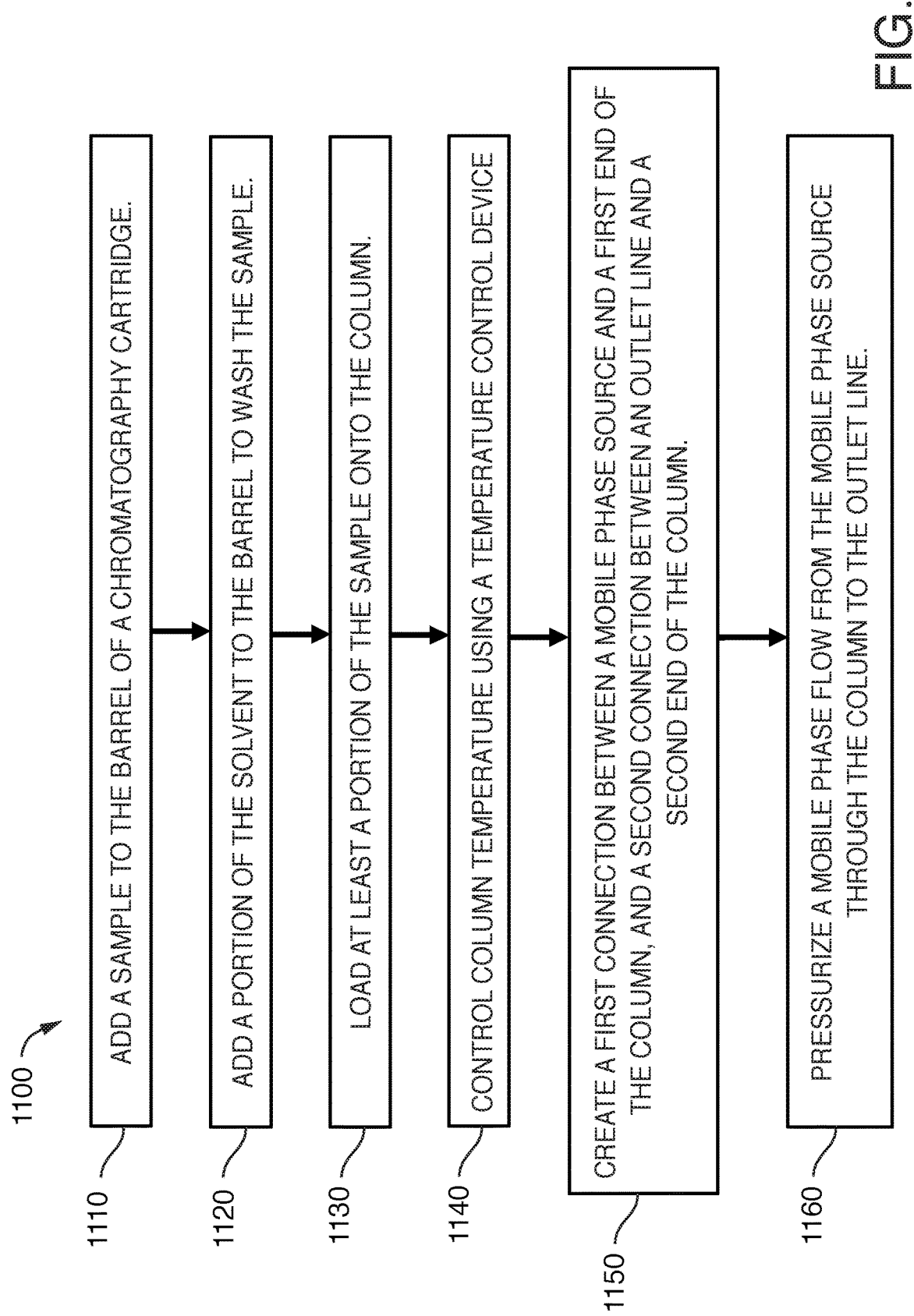
FIG. 11 provides a method according to an embodiment of the present technology.

FIG. 11 shows a method according to the present technology. In general, method 1100 is directed to the cleaning and separation of a sample within a μSPE cartridge. Method 1100 provides direct connection of the mobile phase to the column, thereby bypassing the barrel section. Method 1100 includes several steps. Step 1110 provides for adding a sample to the barrel of the chromatography cartridge. The sample may be added manually or by an automatic sampler device. Step 1120 calls for adding a portion of solvent to the barrel to wash the sample. In some cases, a series of wash steps may be performed to better provide for the washing of the sample. The wash solvent may be removed from the barrel through the column, or may be removed by suctioning the solvent from the barrel to avoid or limit exposure to the column. Step 1130 calls for loading at least a portion of the sample onto the column. Loading may be accomplished by providing solution, which may be under some pressure into the barrel. Additionally, negative pressure may be applied to the opposite end of the column in order to encourage the loading. The sample may be loaded by gravity once the sample has been solvated. In certain embodiments, the mobile phase for the separation may be suitable for loading the column.

Step 1140 calls for controlling the temperature of the column using a temperature control device. As discussed above, the temperature control device can include, for example, a heating and/or cooling device such as a thermoelectric device, resistive temperature control device, inductive temperature control device, stirling engine, or some other suitable device. The ability to control the temperature of the cartridge at or near the column can allow a user to load the cartridge at room temperature to enhance retention and elute at a higher temperature, operate at a constant high temperature in order to narrow peak widths in certain types of chromatography, operate at a constant warm temperature in order to enhance an enzymatic or chemical process, load at sub-ambient temperatures to further enhance retention, accentuate temperature dependent workflows (e.g. hydrogen-deuterium exchange or online chemical derivatization), or cool the system to maintain chemical stability. In some embodiments, the heating element is configured to warm the device such that it operates at a substantially constant temperature between about 20-90 degrees Celsius. For example, enzymatic reactions (e.g. desorption) are often performed at about 37 C, or between 20-90 C, or even at 100 C. In nucleic acid applications, denaturation (i.e. changing double stranded form into single stranded) can be achieved by temperatures as high as 90 C.

Step 1150 calls for creating a first connection between a mobile phase source and a first end of the column such that the connection bypassing the barrel, and a second connection between an outlet line and a second end of the column. Step 1150 calls for pressurizing a mobile phase flow from the mobile phase source through the column to the outlet line. Pressurizing the mobile phase flow through the column permits the chromatographic separation to occur within the column in order to separate the sample which had previously been loaded.

Figure 12:
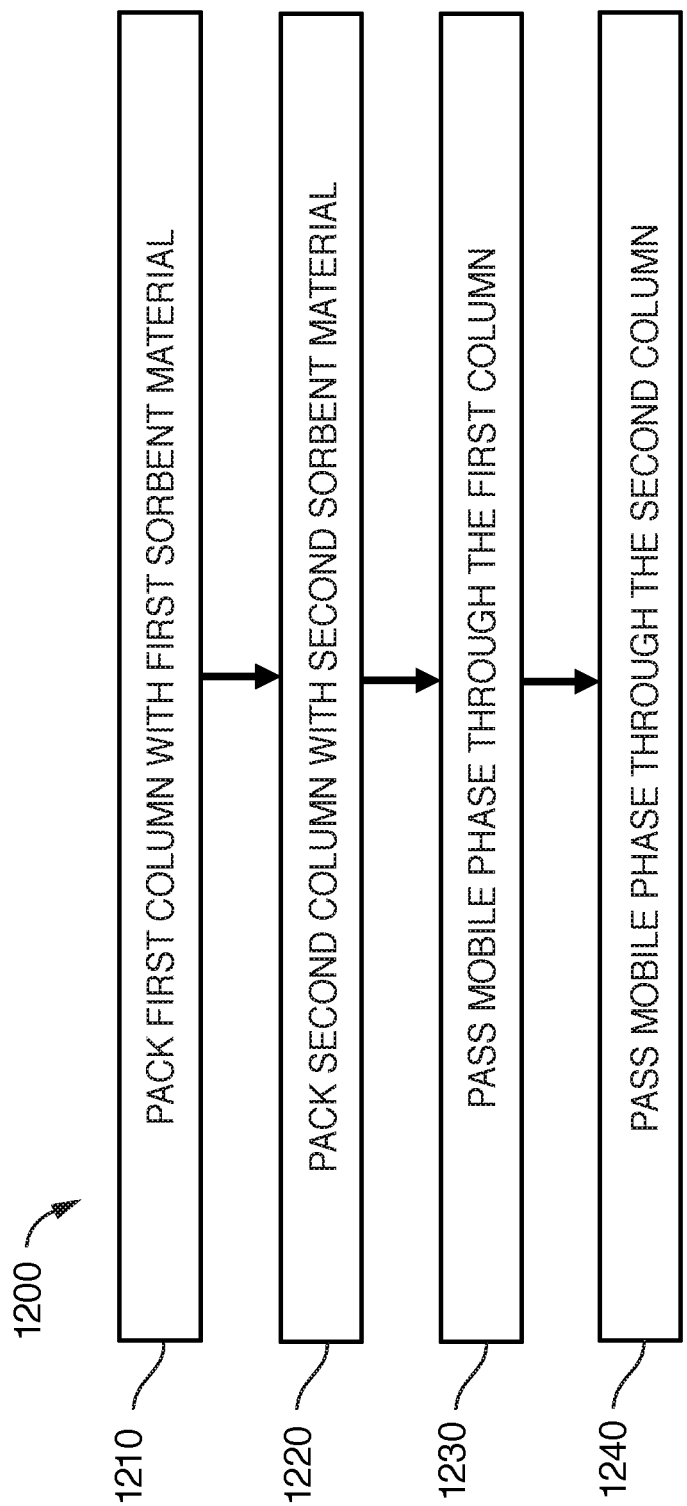
FIG. 12 provides another method according to an embodiment of the present technology.

FIG. 12 provides another method 1200 according to an embodiment of the present technology. In addition to the steps described above with respect to FIG. 11, the column can be packed with sorbent materials that include particles with antibodies bound directly to them. In a two-dimensional chromatography system, the first column can be packed with a first sorbent material, and the second column can be packed with a second sorbent material in order to target different analytes at different dimensions of the chromatography system.

Step 1210 includes packing the first column with a first sorbent material, and step 1220 includes packing the second column with a second sorbent material. The sorbent materials can include, for example, particles that have antibodies to selectively retain small molecules, proteins, or other antibodies. Alternatively, or in addition, the sorbent materials can have enzymes attached to them in order to perform specific modifications to certain classes of molecules. The sorbent material can include, for example, particles that have one or more of protein A, G, or L attached to them to retain certain classes of antibodies. In another embodiment, the sorbent material can include particles that have one or more or trypsin, pepsin, PNGaseF, or IdeS attached to them to perform specific digestion or modifications to certain classes of molecules.

Once the columns have been packed with the sorbent materials, the mobile phase is passed through the first column in step 1230. Upon exiting the first column, the mobile phase can then pass through the second column in step 1240. The ability to target different analytes at different levels of a chromatography process allows for increased control over the chromatographic method.

Figure 13:
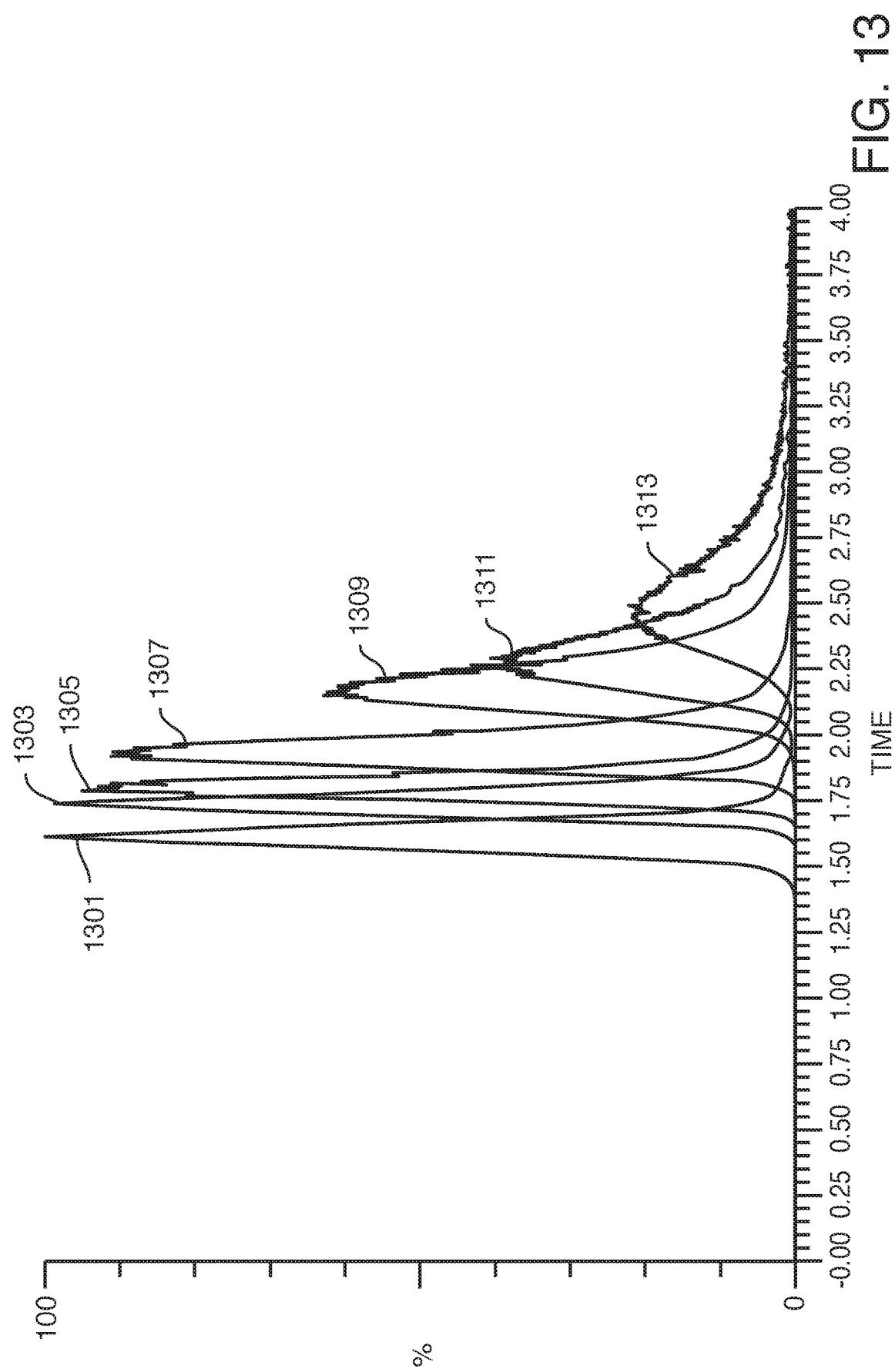
FIG. 13 illustrates a chromatogram demonstrating the impact of heating a cartridge resistively, according to an embodiment of the present disclosure.

FIG. 13 illustrates a chromatogram of a sample containing a small molecule, and demonstrating the impact of heating a cartridge, according to an embodiment of the present disclosure. As discussed above, the cartridge or a portion of the cartridge can be heated resistively, or using another suitable heating technique. The example chromatogram shown in FIG. 13 is of a sample containing a small molecule that has been captured by a µSPE device which has been packed with antibody-linked particles and eluted online to a mass spectrometer. The chromatogram demonstrates the impact of heating the cartridge in order to achieve narrow peak widths. The graph shows various plots 1301-1311 where the cartridge was heated at various voltage levels, and one plot 1313 where the cartridge was not heated. Specifically, plots 1301, 1303, 1305, 1307, 1309, and 1311 are chromatograms of samples containing a small molecule where the cartridge was heated using voltages of 19V, 17V, 15V, 13V, 10V, and 5V, respectively.

Figure 14:
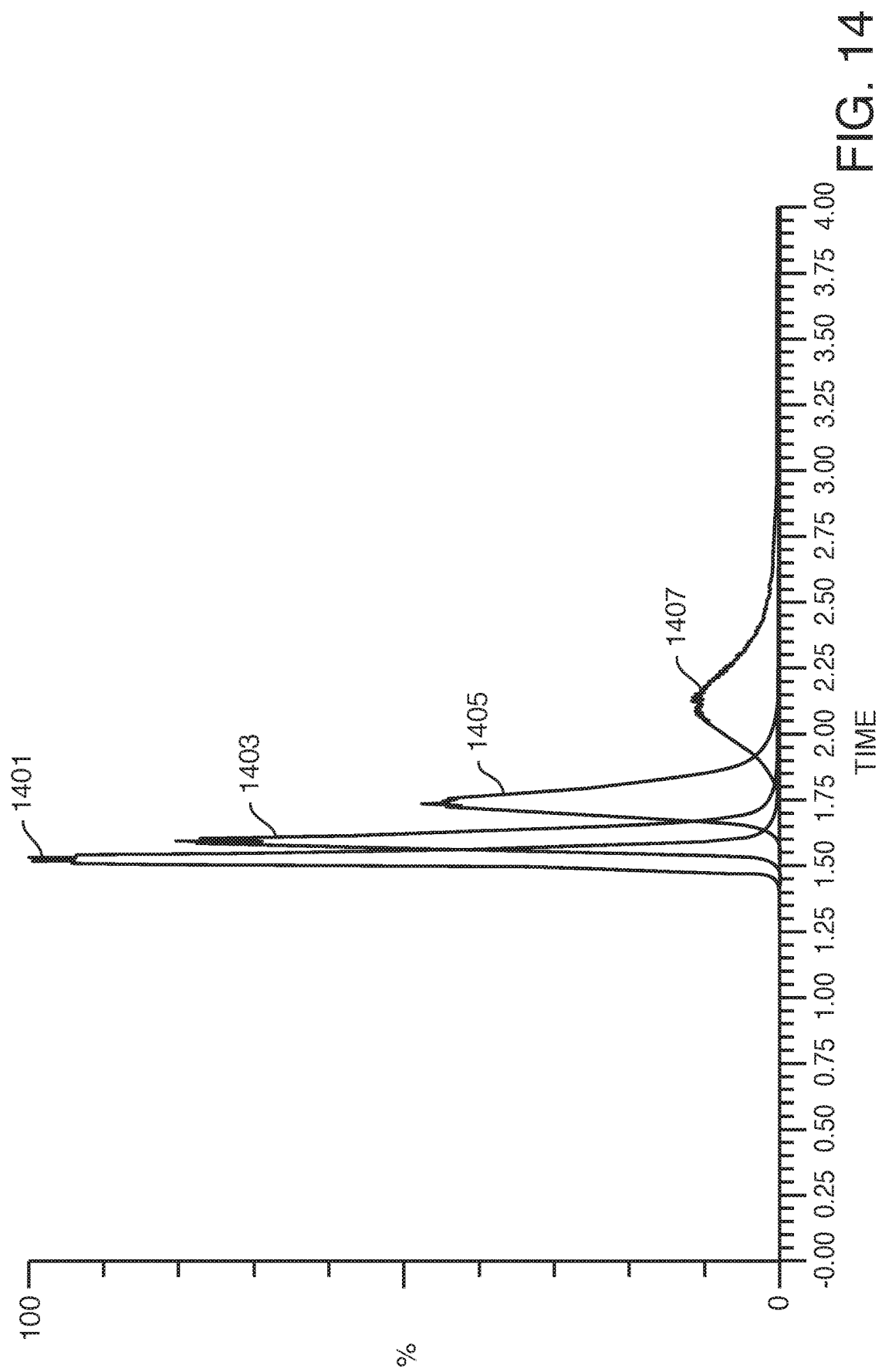
FIG. 14 illustrates a chromatogram demonstrating the impact of alternate elution solvents, according to an embodiment of the present disclosure.

FIG. 14 illustrates a chromatogram of a sample containing a small molecule, and demonstrating the impact of alternate elution solvents, according to an embodiment of the present disclosure. As discussed above, the cartridge or a portion of the µSPE device can be packed with sorbents or particles which have Protein A/G/L bound to them. The example chromatogram shown in FIG. 14 is of a sample containing a small molecule that has been captured by a µSPE device which has been packed with antibody-linked particles and eluted online to a mass spectrometer. The chromatogram demonstrates the impact of using alternate elution solvents. Specifically, for plot 1401 a solution of 40% MeCN+1.0% FA was used, for plot 1403 a solution of 30% MeCN+1.0% FA was used, for plot 1405 a solution of 20% MeCN+1.0% FA was used, for plot 1401 a solution of 40% MeCN+1.0% FA was used, and for plot 1407 a solution of 10% MeCN+1.0% FA was used.

As antibodies are often made in a bioreactor, it is important to monitor how much is present at any moment in time. By sampling directly from the reactor in an automated fashion and passing the sample through a µSPE device containing particles with Protein A/G/L attached to them, it is possible to then elute the antibodies online to a detector, to a second chromatographic dimension followed by detection, or to a reaction system. Within an example reaction system, the eluent can be mixed with a derivatization reagent for improved detection/chromatographic performance, followed by detection. In alternative embodiments, the example reaction system can pass the eluent through an immobilized enzyme reactor (IMER) to digest the antibody in specific ways (light chain/heavy chain, deglycosylation, catabolism, etc.) followed by chromatography and detection.

Figure 15:
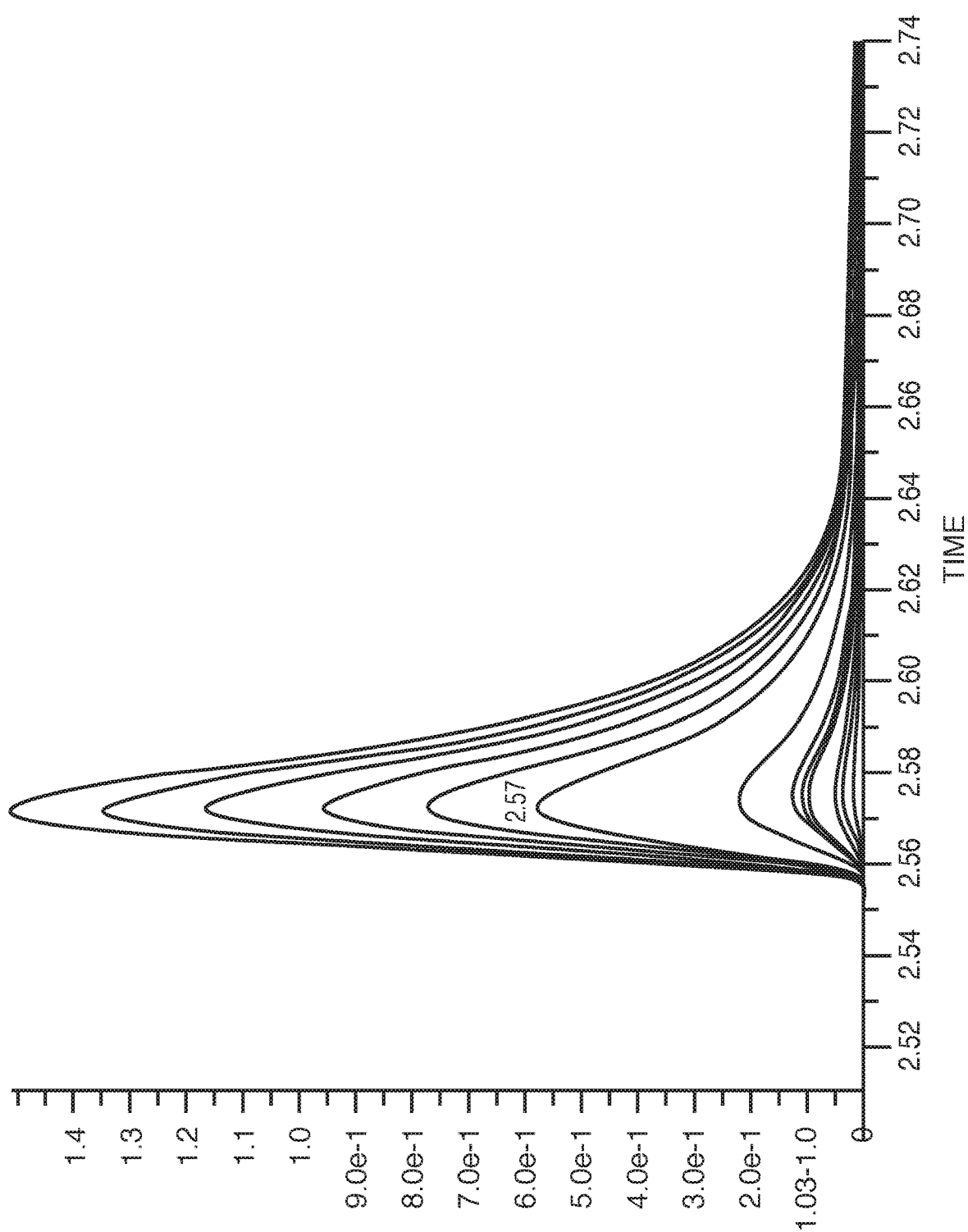
FIG. 15 illustrates a chromatogram of a sample containing an antibody that has been captured by a cartridge packed with Protein A linked particles and eluted to a UV detector, according to an embodiment of the present disclosure.

FIG. 15 illustrates a chromatogram of a sample containing an antibody that has been captured by a cartridge packed with Protein A linked particles and eluted to a UV detector, according to an embodiment of the present disclosure. Each curve within this chromatogram represents a different volume load. In this particular non-limiting example, load volumes between about 1-25 microliters were used. In alternative embodiments, up to 100 microliters have been used for similar experiments.

According to various embodiments of the present disclosure, combinations of multiple µSPE devices described above can be used for more complex workflows. One such complex workflow can include capturing antibodies on a protein A packed µSPE device, followed by passing the eluent through a PNGaseF packed µSPE device to provide a deglycosylated, purified antibody for quantitation/qualification. Another example workflow can include capturing proteins using an antibody packed µSPE device, followed by passing the eluent through a trypsin packed µSPE device to allow for peptide mapping/surrogate peptide quantitation workflows. Another example workflow can include injecting a sample through a pepsin packed µSPE device, followed by trapping on a C18 packed µSPE device allowing the generated peptides to be captured for subsequent analysis by LC-MS (online or offline, peptide mapping or quantitation).

One of ordinary skill in the art will appreciate further features and advantages of the invention based on the above-described embodiments. Accordingly, the invention is not to be limited by what has been particularly shown and described, except as indicated by the appended claims.

What is claimed is:

1. A cartridge for use in the washing and separation of a sample comprising a barrel having a barrel first end that is open and a barrel second end opposite the barrel first end; a column segment, having a column segment first end connected to the barrel second end and a column segment second end opposite the column segment first end; a column spanning the column segment, the column containing a sorbent material and having a column first end in fluid communication with the barrel second end and a column second end opposite the column first end; a jacket in contact with, and surrounding an exterior surface of the column segment, wherein the jacket is capable of withstanding internal pressures of about 5000 psi (345 bar); and a mobile phase source port at the column segment first end and in fluid communication with the column first end; wherein the sorbent material includes particles that have antibodies attached to them to selectively retain analytes, proteins attached to them to retain certain classes of antibodies, or enzymes attached to them to perform specific modifications to certain classes of molecules.

2. The cartridge of claim 1, wherein the sorbent material includes particles that have antibodies to selectively retain small molecules proteins or other antibodies.

3. The cartridge of claim 1, wherein the sorbent material includes particles that have one or more of protein A, G, or L attached to them to retain certain classes of antibodies.

4. The cartridge of claim 1, wherein the sorbent material includes particles that have one or more of trypsin, pepsin, PNGaseF, or IdeS attached to them to perform specific digestion or modifications to certain classes of molecules.

5. The cartridge of claim 1, further comprising: a temperature control element operatively coupled to the column segment and configured to control a temperature of the column, wherein the temperature control element includes a heating element configured to heat the column segment.

6. The cartridge of claim 5, wherein the heating element is configured to heat the column segment after the column segment has been loaded at room temperature.

7. The cartridge of claim 5, wherein the heating element is configured to heat the column segment in order to produce narrow peak widths in certain types of chromatography.

8. The cartridge of claim 5, wherein the heating element is configured to operate at a substantially constant temperature between about 20-90 degrees Celsius.

9. The cartridge of claim 5, wherein the temperature control device includes a cooling element configured to cool the column.

10. The cartridge of claim 9, wherein the cooling element is configured to cool the column in order to load the column at sub-ambient temperatures.

11. The cartridge of claim 1, wherein the jacket comprises at least one of high-density polyethylene (HDPE), polyether ether ketone (PEEK), polyamide (PA), polypropylene (PP), polyvinylidene fluoride (PVDF), ceramic or metal.

12. A method for the washing, extraction, and separation of a sample in a chromatography cartridge comprising a barrel and a column spanning a column segment, wherein the column segment is surrounded by a jacket in contact with, and surrounding an exterior surface of the column segment, and wherein the jacket is capable of withstanding internal pressures of about 5000 psi (345 bar), the method comprising, adding a sample to the barrel; adding a portion of solvent to the barrel to wash the sample; loading at least a portion of the sample onto the column; controlling the temperature of the column using a temperature control device operatively coupled to the column; creating a first connection between a mobile phase source and a first end of the column, such that the connection bypasses the barrel, and a second connection between an outlet line and a second end of the column; and pressurizing a mobile phase flow from the mobile phase source through the column to the outlet line.

13. The method of claim 12, wherein controlling the temperature of the column includes heating the column after loading the column.

14. The method of claim 13, wherein controlling the temperature of the column includes cooling the column to load at sub-ambient temperatures in order to enhance retention.

15. The method of claim 12, wherein controlling the temperature of the column includes operating the temperature control device at a substantially constant temperature to achieve narrow peak widths.

16. The method of claim 12, wherein controlling the temperature of the column includes operating the temperature control device at a substantially constant temperature between about 20-90 degrees Celsius.

17. The method of claim 12, further comprising packing at least a portion of the column with sorbent materials including particles that have antibodies attached to them to selectively retain analytes, proteins attached to them to retain certain classes of antibodies, or enzymes attached to them to perform specific modifications to certain classes of molecules.

18. The method of claim 17, further comprising passing a mobile phase through a column packed with a second sorbent material after passing the mobile phase through a column having a first sorbent material, wherein the first sorbent material and the second sorbent material includes particles that have antibodies attached to them to selectively retain analytes, proteins attached to them to retain certain classes of antibodies, or enzymes attached to them to perform specific modifications to certain classes of molecules.

19. The method of claim 12, wherein the jacket comprises at least one of high-density polyethylene (HDPE), polyether ether ketone (PEEK), polyamide (PA), polypropylene (PP), polyvinylidene fluoride (PVDF).

20. The method of claim 12, wherein controlling the temperature of the column includes cooling the column to load at sub-ambient temperatures in order to enhance retention.

* * * * *